US012151218B2

(12) United States Patent
Hellmers et al.

(10) Patent No.: US 12,151,218 B2
(45) Date of Patent: Nov. 26, 2024

(54) WINE DECANTER

(71) Applicant: BREVILLE PTY LIMITED, Alexandria (AU)

(72) Inventors: Duncan Bruce Hellmers, Lane Cove (AU); Stephen John McClean, Camden South (AU); Pierce James Barnard, Cherrybrook (AU)

(73) Assignee: BREVILLE PTY LIMITED, Alexandria (AU)

( * ) Notice: Subject to any disclaimer, the term of this patent is extended or adjusted under 35 U.S.C. 154(b) by 1074 days.

(21) Appl. No.: 17/074,573

(22) Filed: Oct. 19, 2020

(65) Prior Publication Data

US 2021/0031155 A1 Feb. 4, 2021

Related U.S. Application Data

(63) Continuation of application No. 15/769,325, filed as application No. PCT/AU2016/050982 on Oct. 19, 2016, now abandoned.

(30) Foreign Application Priority Data

Oct. 19, 2015 (AU) ................................ 2015904277

(51) Int. Cl.

| | |
|---|---|
| ***B01F 23/234*** | (2022.01) |
| ***A47G 23/00*** | (2006.01) |
| ***A47G 23/02*** | (2006.01) |
| ***B01F 25/54*** | (2022.01) |
| ***B01F 27/86*** | (2022.01) |
| ***B01F 27/88*** | (2022.01) |
| ***B01F 33/453*** | (2022.01) |

(Continued)

(52) U.S. Cl.
CPC ........ *B01F 23/23411* (2022.01); *A47G 23/00* (2013.01); *A47G 23/0241* (2013.01); *B01F 25/54* (2022.01); *B01F 27/861* (2022.01); *B01F 27/88* (2022.01); *B01F 33/4535* (2022.01); *B01F 35/2205* (2022.01); *B01F 35/221422* (2022.01); *B01F 35/92* (2022.01); *B01F 2035/98* (2022.01); *B01F 2101/17* (2022.01)

(58) Field of Classification Search
CPC .... B01F 27/861; B01F 33/4535; B01F 35/92; B01F 35/221422; A47G 23/00; A47G 23/0241
See application file for complete search history.

(56) References Cited

U.S. PATENT DOCUMENTS

| | | | |
|---|---|---|---|
| 4,494,452 | A | 1/1985 | Barzso |
| 4,776,990 | A | 10/1988 | Verity |

(Continued)

FOREIGN PATENT DOCUMENTS

| | | | | |
|---|---|---|---|---|
| CN | 203064409 | U | | 7/2013 |
| CN | 204260593 | U | * | 4/2015 |
| GB | 221895 | A | | 9/1924 |

OTHER PUBLICATIONS

International Search Report and Written Opinion for PCT/AU2016/050982, mailed Dec. 22, 2016.

(Continued)

*Primary Examiner* — Thien S Tran
(74) *Attorney, Agent, or Firm* — Patterson + Sheridan, LLP

(57) ABSTRACT

A decanting vessel has an internal pump for recirculating a beverage such as wine and aerating it within the decanter.

12 Claims, 17 Drawing Sheets

(51) Int. Cl.

| | |
|---|---|
| ***B01F 35/22*** | (2022.01) |
| ***B01F 35/221*** | (2022.01) |
| ***B01F 35/90*** | (2022.01) |
| ***B01F 35/92*** | (2022.01) |
| ***B01F 101/17*** | (2022.01) |

(56) References Cited

U.S. PATENT DOCUMENTS

| | | | |
|---|---|---|---|
| 4,785,724 | A | 11/1988 | Vassallo |
| 6,019,034 | A | 2/2000 | Ford, Sr. |
| 6,332,706 | B1 | 12/2001 | Hall |
| 6,425,421 | B1 | 7/2002 | Morrison |
| 6,508,163 | B1 | 1/2003 | Weatherill |
| 9,321,019 | B2 | 4/2016 | Stevenson et al. |
| 2010/0058933 | A1 | 3/2010 | Cheng |

OTHER PUBLICATIONS

Extended European Search Report for European Patent Application No. 16856486.2, dated Jul. 1, 2019.

* cited by examiner

WINE DECANTER

FIELD OF THE INVENTION

The invention relates to wine decanting and more particularly to a pump that may be combined with a decanting vessel for the purpose of recirculating wine within that vessel.

BACKGROUND OF THE INVENTION

Some wines have a musty reductive character that can be mitigated with aeration. Similarly, some wines have relatively high levels of dissolved gasses that have a negative impact on aroma and pallet. Wines often improved from coming into contact with air. A glass decanter can be used to increase the surface area of contact between the wine and the air, improving the aroma and flavour.

OBJECTS AND SUMMARY OF THE TECHNOLOGY

It is an object of the invention to provide a pump adapted to cause vertical recirculation within a decanting vessel.

It is yet another object of the invention to reduce the amount of time required to decant wine.

It is another object of the invention to provide a decanting vessel that incorporates a pump and vertical recirculation conduit within it.

It is another object of the invention to provide a combination of motorised base, vessel and pumping system within that vessel for the purpose of aerating wine.

Accordingly, it is an object of the technology to provide a decanting vessel having within it a pump and vertical conduit that extends above a fill level for that vessel.

The technology also provides a motorised base that cooperates with a removable decanter, the decanter having within it a pump and vertical conduit that extends above a fill level of the vessel.

The technology also provides a decanter having within it a pumping system and vertical conduit, the conduit terminating in a distribution head that creates a descending curtain of wine within the vessel.

BRIEF DESCRIPTION OF THE DRAWING FIGURES

In order that the invention be better understood, reference is now made to the following drawing figures in which.

BEST MODE AND OTHER EMBODIMENTS

Figure 1:
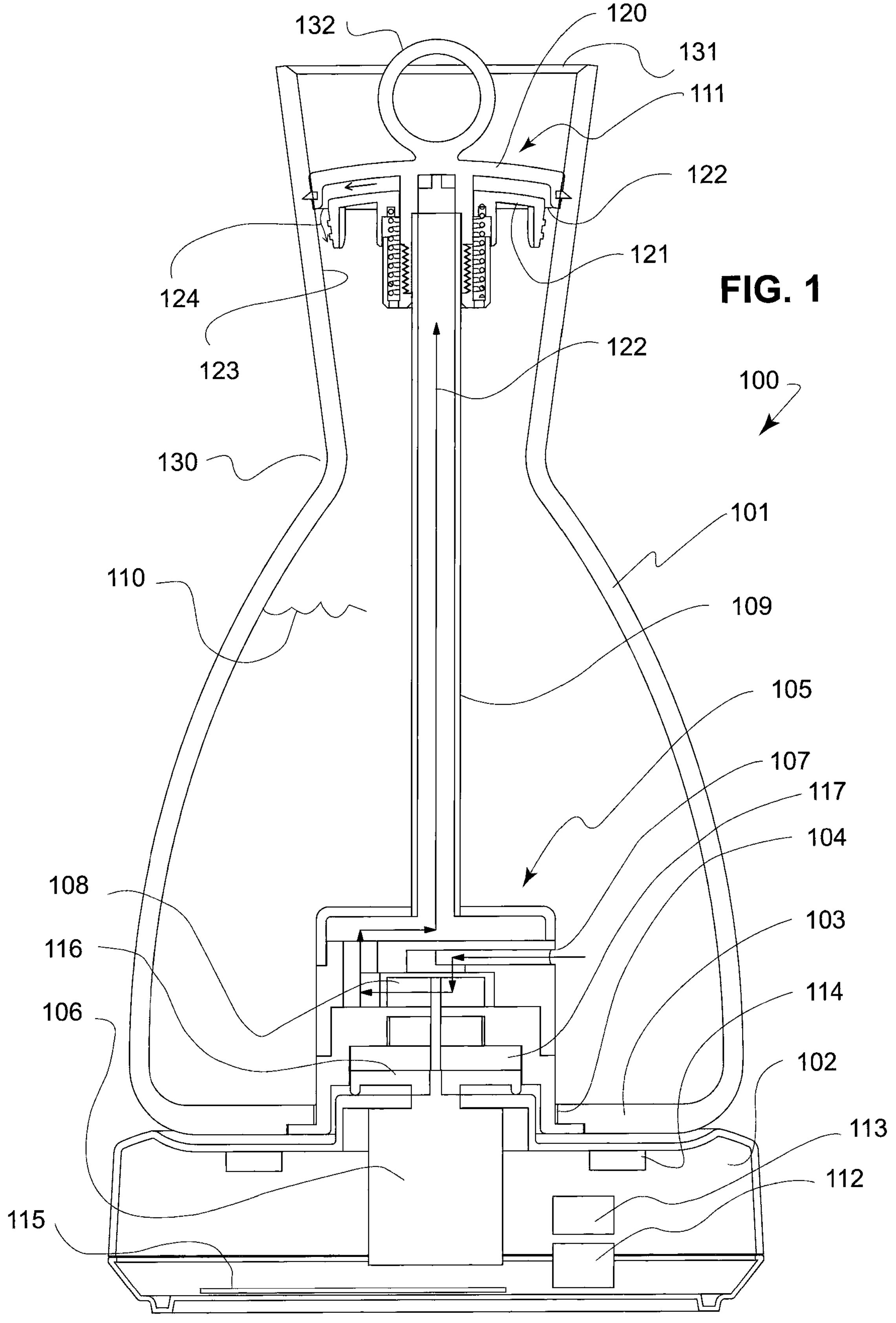
FIG. 1 is a cross sectional view of a wine decanter and base.

As shown in FIG. 1, a decanting apparatus 100 comprises a vessel such as a transparent or translucent glass wine decanter 101 that cooperates with a base 102. The decanter 101 is preferably glass. Plastic or stainless steel decanters are also convenient. The decanter 101 has a generally flat bottom 103 in which is formed a central or other opening 104. The opening receives a pump 105 assembly. As will be explained, the pump beverage assembly 105 may be permanently installed into the decanter 101 or removable from it.

Even when portions of the assembly are permanently affixed to the decanter, the pump itself is preferably removable from the remainder of the assembly for cleaning. The pump is driven by a motor 106 in the base (external to the vessel). The pump 105 has an inlet 107 through which any liquid, particularly wine, is drawn into the pump. The pump has a body within which is a rotating impeller (or other means) 108 that propels the wine into and up a vertical conduit 109. The vertical tube or conduit 109 is preferably centrally located along the vessel's centre line and extends above a nominal maximum fill level 110 associated with the decanter. In this example, the conduit 109 terminates in a distributing head 111 that also functions as an airtight stopper. The spout discharges the beverage against the interior wall of the vessel. The spout discharges a pattern that coalesces into a thin, continuous curtain that descends the interior of the carafe and promotes aeration of the wine. In the example of FIG. 1, the gap or spout 122 is above the neck 130 of the decanter. However, the head 111 is accessible from above the rim 131 of the decanter because the handle or pull ring extends above the rim 131.

The base 102, apart from the motor 106 may contain batteries (or transformer or power supply or induction coil) 112 for powering the motor and other aspects of the base, an optional wireless communications module 113 and an optional thermionic or other refrigeration module 114 located just below the upper surface of the base that supports the decanter. The base has a processor or printed circuit board assembly (PCBA) 115 that regulates the operation of the base in response to various user inputs.

The base's motor 106 drives a first coupling component 116 that is located above the upper surface of the base. The first coupling component 116 drives a second coupling component 117 that is associated with and attached to the pump 105 in the decanting vessel 101. In this way the pump 105 can be driven by the motor 106 while maintaining the removability of the decanter 101 and its pump 105 from the base 102.

As suggested by FIG. 1, and as will be explained, the distributing head 111 has engageable parts, a stationary upper part 120 and a vertically reciprocating and rotatable lower part 121. Wine pumped vertically up through the conduit 122 passes between the upper and lower parts 120, 121. It is thereafter dispensed through a circumferential gap or spout 122 between the upper and the lower parts 120, 121. In this example, the gap 122 is directed or faces downwardly. The gap 122 is in close proximity with the inner side wall 123 of the vessel. The circumferential gap 122 thus creates a flow or curtain 124 of wine that descends back into the body of the vessel. In preferred embodiments, the curtain 124 is largely or entirely continuous and uninterrupted, thus creating a large surface area of contact between the curtain 124 as it descends along the interior side wall 123.

As suggested by FIG. 1, the base need not have any dedicated external user interface. This is because it has a Wi-Fi or other wireless communication module 113 that is adapted to received signals that may be transmitted by a user from a device such as a Wi-Fi enabled telephone, computer, or otherwise over a wireless network.

Figure 2:
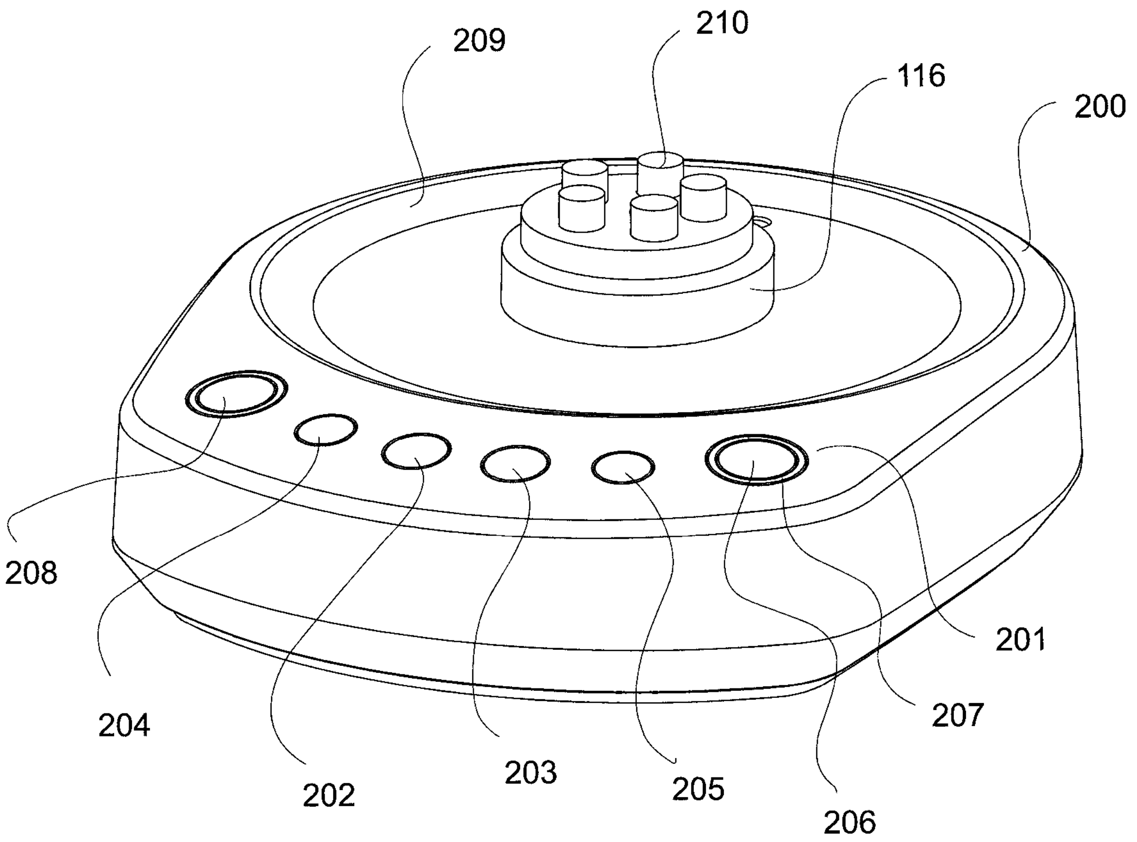
FIG. 2 is perspective view of a base for a wine decanter.

However, as suggested by FIG. 2, the base 200 may be provided with an external user interface 201, in this example, the interface 201 comprises electromechanical buttons that govern the operation of the base and therefore the pump 105. As will be explained, the degree of aeration of the wine in the decanter is largely dependent on the flow characteristics of the wine as determined by the operating speed of the pump 105. Accordingly, the user interface 201 is provided with a user control for increasing or decreasing the rotational speed of the pumps and impeller 108. In this example, one button 202 is provided for decreasing the operational speed of the motor 106 and a second button 203 is provided for increasing the speed of the motor 106. By way of example, another user control, when activated, stores a particular user selected motor speed as a favorite 204. An additional user control is used to run the pump at its maximum speed so as to provide the quickest possible aeration 205. The interface 201 is also provided with a start/cancel control 206 that in this example is provided with an illuminated ring 207 to indicate the operational status of the device. An additional user control 208 causes the processor 115 to engage in an auto-clean and/or rinse routine that may be used in conjunction with an appropriate cleaning solution at manufacture recommended intervals. The routine may be for a pre-selected fixed interval.

In the example of FIG. 2, the first coupling component 116 is located in the centre of a dish-like recess 209 on an upper surface of the base 200. In this example, the first coupling component 116 is in the form of a mechanical coupling having male or vertically extending coupling features 210 that engage and cooperate with female coupling features located on an underside of the second coupling component 117.

Figure 3:
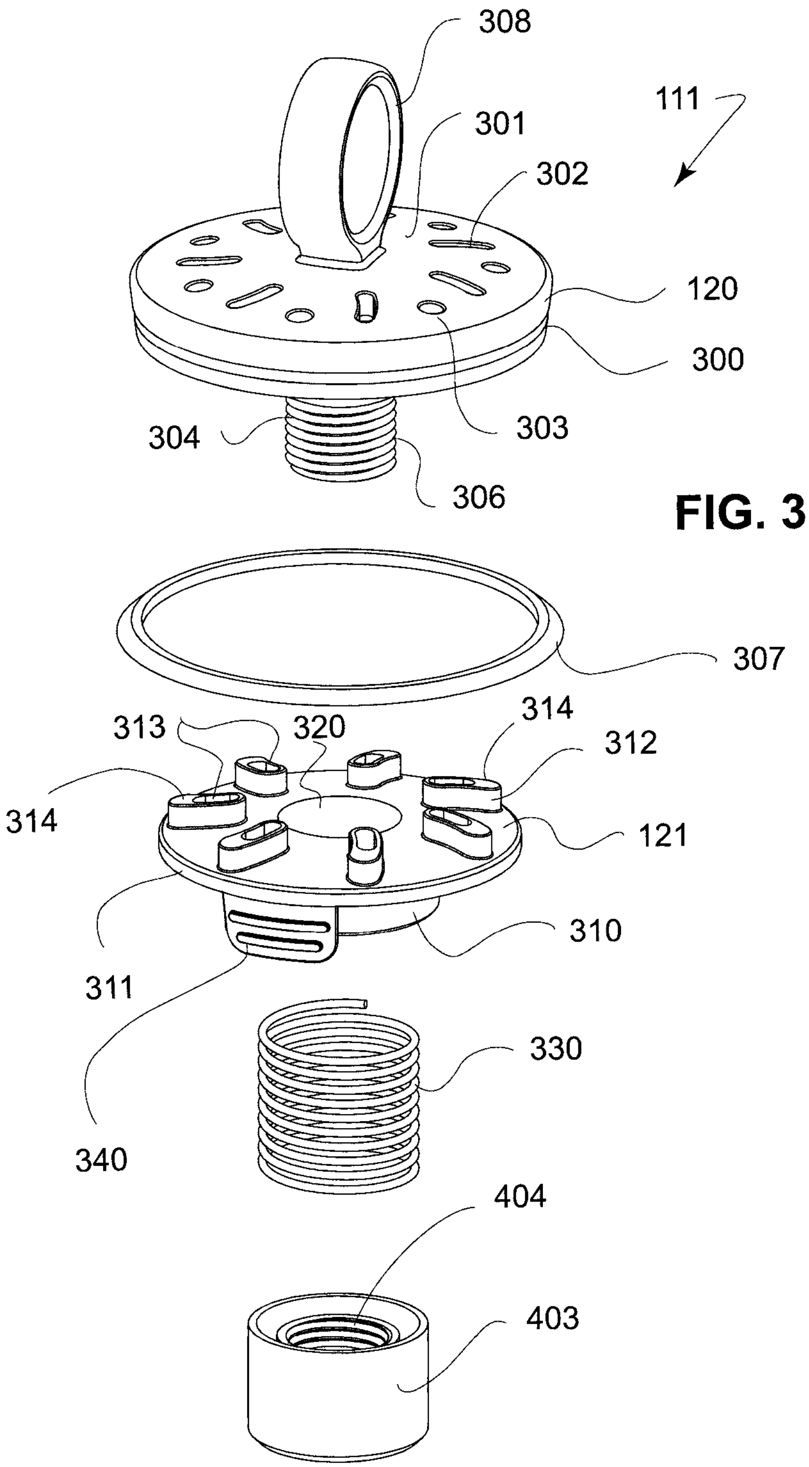
FIG. 3 is an exploded perspective view of the stopper shown in FIG. 1.
Figure 4:
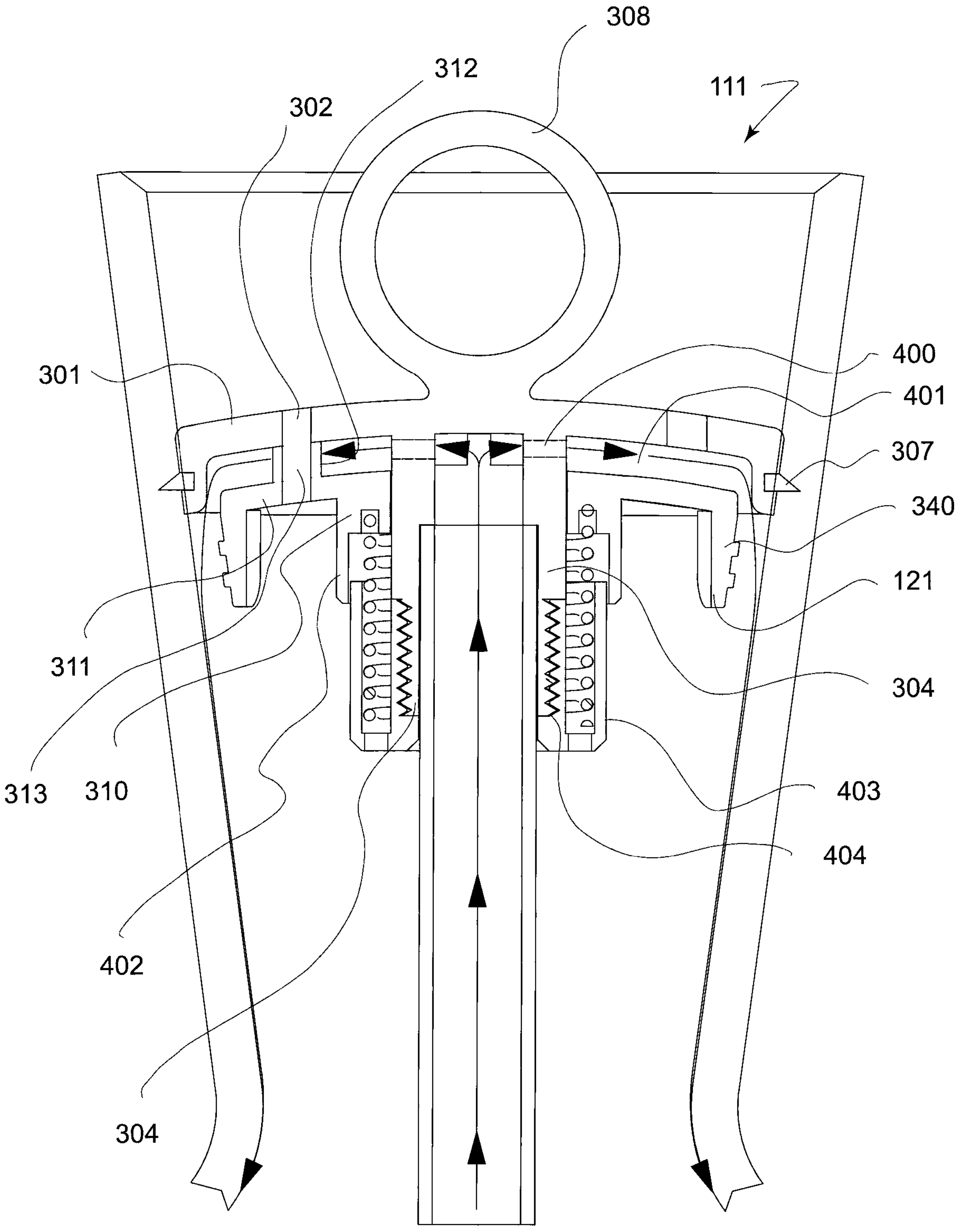
FIG. 4 is a cross sectional view of the stopper shown in FIG. 1.

The distributing head and stopper 111 depicted in FIG. 1 is shown in greater details in FIGS. 3 and 4. As shown in FIG. 3, the stationary or upper part 120 comprises a body shaped to conform to the internal shape of the decanter. In this example, the upper part 120 is round, having a side wall in which is formed a circumferential groove 300 for receiving a polymeric seal 307. The top surface 307 of the upper part is provided with an array of openings. In this example, the array has alternating radial slots 302 that pass through the top surface 307. The slots 302 alternates with smaller through openings 303. The slots 302 extend radially inward further than the through openings 303. The upper rotating part 120 also has a centrally located neck 304. The neck 304 has an internal bore that receives and seals against the upper extent of the vertical conduit 109. The upper part of the neck has one or more discharge ports 400. The neck 304 has threads 306 on its exterior. The upper surface 301 supports a vertically orientated pull ring 308 or other grip.

The lower or reciprocating part 121 has a central hub 310 that supports a flange 311. The flange 311 fits within a recess 401 formed in an underside of the upper part 120. The upper surface of the flange 311 supports an array of vertically extending posts 312. Each post 312 is provided with a through opening 313. The upper surface of each post, radially outward of the through opening 313 comprises a flat stopper portion 314. When rotated into position, the stopper portion 314 occludes the through openings 303 in the upper part 120. In another rotational orientation, the through openings 313 of the lower part align with the slots 302 in the upper part 120. Thus, the lower part 121 has two principal rotational orientations with respect to the upper part 120.

In the first orientation, the through openings 303 admit air into the gap between the upper and the lower parts 120, 121 and the through openings 313 cooperate with the slots 302 so that gasses within the decanter can be vented to the atmosphere.

In order to facilitate rotation between the upper and lower parts 120, 121, the lower part is provided with a central bore 320 that is adapted to admit the neck 304 of the upper part for rotation therewithin. An upper side of the lower part 121 has a circumferential collar 402 that fits over the outside of a cup 403. The cup has internal threads 404 that cooperate with the threads 306 on the upper part's neck 304. Together, the collar 402 and cup 403 define a cavity for receiving a compression spring 330. In this way, the lower part 121 can be manually retracted away from the upper part for ease of rotation of the lower part 121. The spring 330 biases the lower part 121 upwardly and into engagement with the underside of the upper part 120. The outside rim of the lower part may be provided with opposing fins or finger grips 340. The action of retracting the lower part and rotating it are thereby facilitated by the finger grips 330 and pull ring 308.

Accordingly, the distributing head and stopper are user adjustable so as to act as either an airtight stopper or curtain-producing spout in accordance with the rotational orientation of the lower part 121 relative to the upper part 120. In one orientation, all of the openings 302, 303 in the upper part are occluded whereby the decanter is sealed from the environment. In another rotational orientation, air is admitted into the gap between the upper and lower parts by the through openings 303 and the interior of the decanter is vented owing to the alignment of the second through openings 313 with the slots 302.

It will be appreciated that the particular construction and features of the distributing head and stopper 111 are only exemplary of a preferred embodiment. Other means of creating an effective curtain of wine along the interior walls of the vessel are depicted by way of example in FIGS. 5 and 6.

Figure 5:
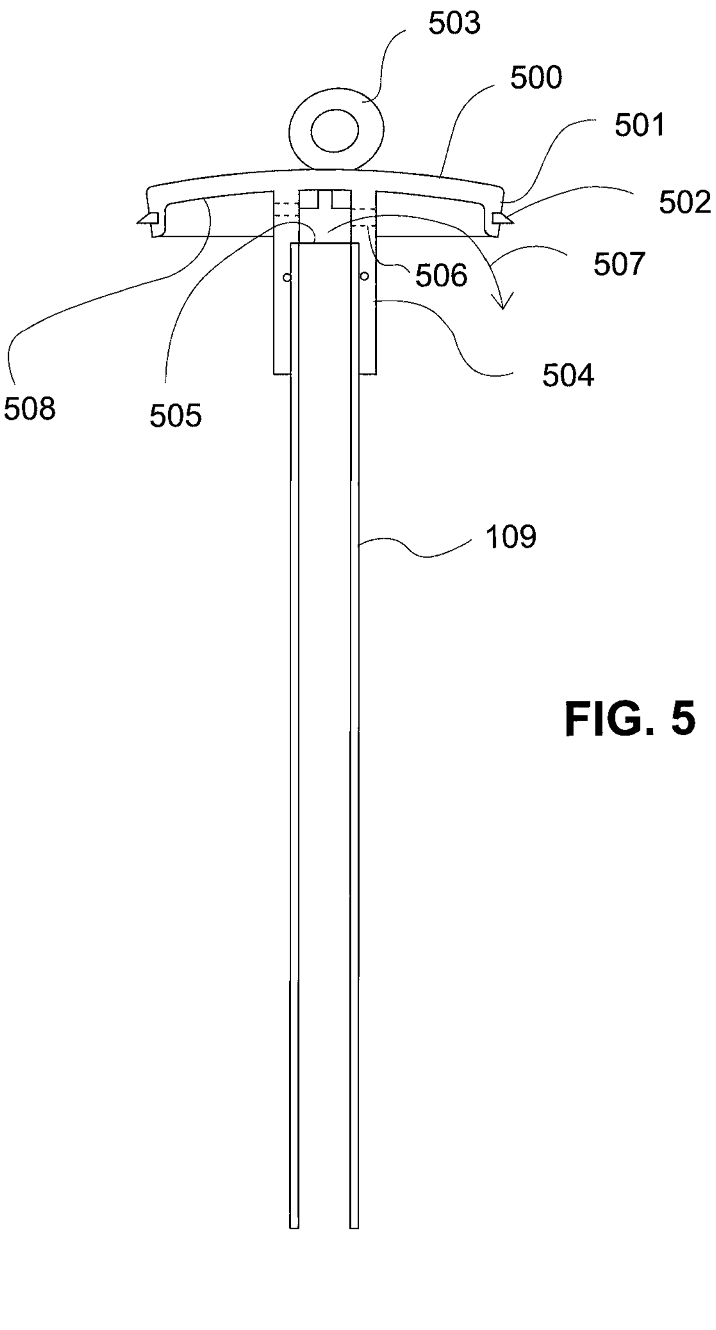
FIG. 5 is a cross sectional view of a stopper.

In the example of FIG. 5, a stopper for a decanter, carafe or vessel utilising a pump of the type depicted in FIG. 1 comprises a solid or unperforated cap 500 having a side wall 501 in which is formed a circumferential groove for receiving a peripheral seal 502. The cap 500 may be provided with a pull ring or other grip 503. The cap has a centrally located neck 504 for receiving the vertical conduit 109. Fluid exiting the upper discharge opening 505 of the conduit 109 passes through radial discharge spout openings 506 in the neck 504. The flow of the discharge 507 is directed downwardly by the shape of the underside 508 of the cap. In preferred embodiments, the cap 500 is removable from the conduit 109.

Figure 6:
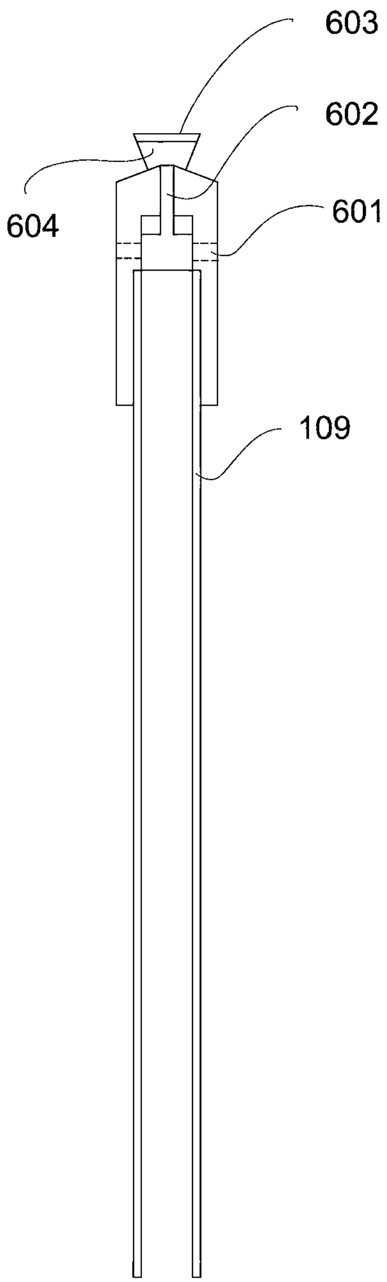
FIG. 6 is a cross sectional view of a stopper.

As shown in FIG. 6, the vertical conduit 109 may be provided with a distribution head provided with either or both of preferably symmetrical or opposing radial discharge ports or spouts 601 or a vertical spout discharge 602 located below a flat or curved plate or obstruction 603. The obstruction 603 is spaced apart from and supported above the exit opening of the vertical port 602 by one or more braces 604. Fluid exiting the radial or vertical ports 601, 602 is directed against the interior side walls of the vessel to create, for example, a descending, symmetrical uniform, curtain of fluid.

Figure 7:
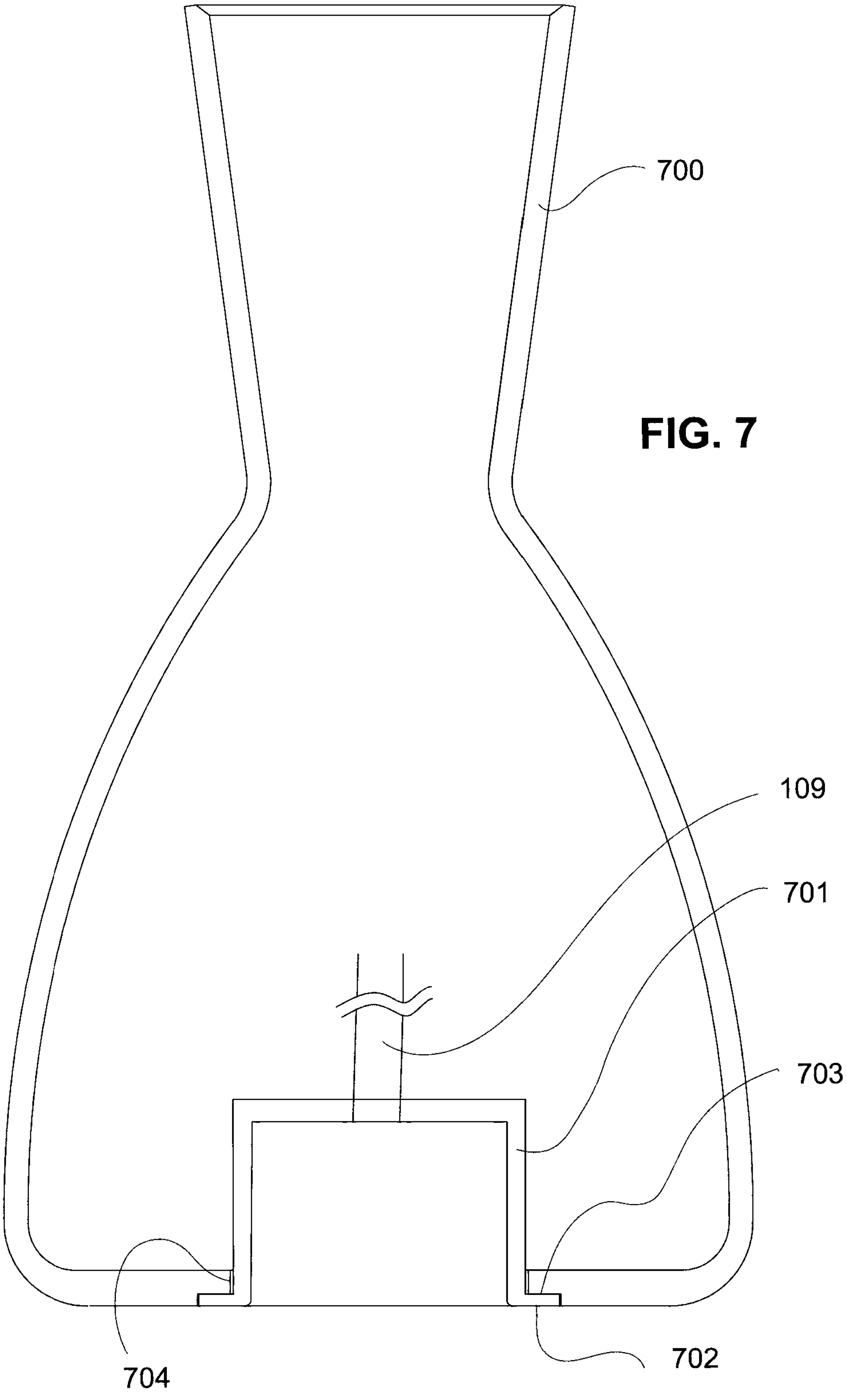
FIG. 7 is a cross sectional view of a decanter and pump housing.

As suggested by FIG. 7, a decanter or carafe 700 may be provided with a permanently installed housing 701. The housing 701 may be fabricated from stainless steel. The housing 701 contains the pump and its coupling component and serves to support and distribute fluid through the vertical conduit 109. In this example, the housing 701 has a circumferential flange 702 that fits within and is sealed against a rebate 703 formed around an opening 704 on a bottom surface of the decanter 700. In preferred embodiments, permanent adhesive maintains the flange 702 in the rebate 703.

Figure 8:
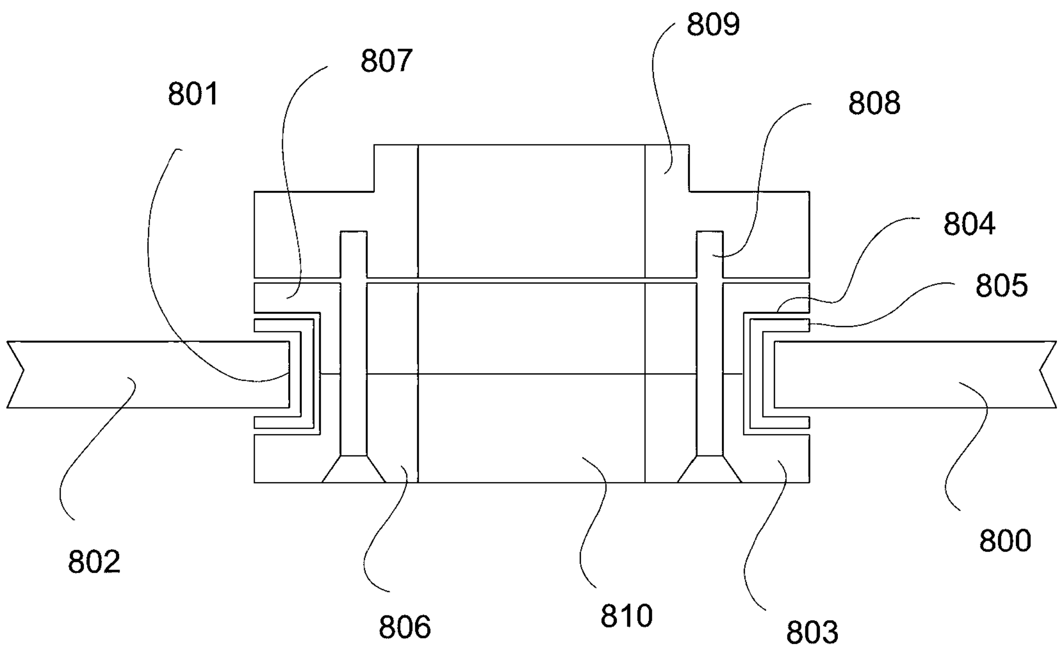
FIG. 8 is a cross sectional view of a sealing arrangement.

As shown in FIG. 8, the decanter 800 may be provided with an opening 801 on its floor or lower surface 802. A removable seal retainer 803 forms a peripheral groove 804 for retaining a polymeric seal 805. In this example, the retainer 803 is formed from two separable parts, being a lower part 806 and an upper part 807. The two parts are joined in a face-two-face arrangement and clamped together with one or more fasteners 808. In some embodiments, through openings in the retainer 803 allow the fasteners to engage an underside of the pump housing 809. In this example, the seal 805 is "C" shaped in cross section for receiving the inside edge of the opening 801 in the decanter. The retainer 803 has a centrally opening 810 for admitting the base's coupling 116.

Figure 9:
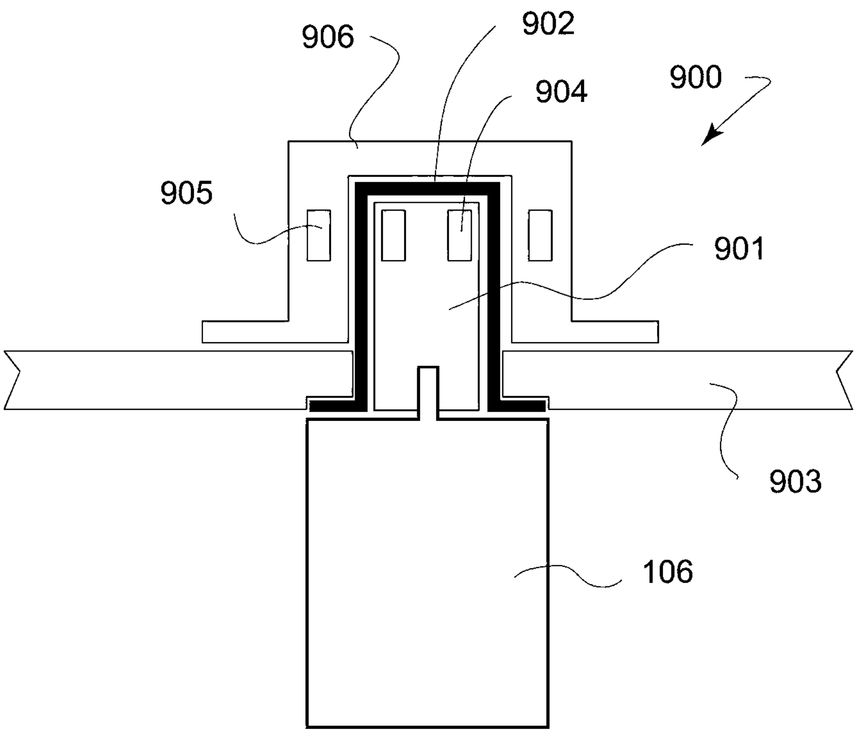
FIG. 9 is a cross sectional view of a wine decanter, base and magnetic coupling.

As shown in FIG. 9, the mechanical coupling arrangement 116, 117 between the motor 106 and the pump's impellor 108 may be replaced by a magnetic coupling arrangement 900. Accordingly, the base's motor 106 is provided with an output shaft that carries a first magnetic coupling component 901. The first magnetic coupling component 901 enters a housing 902 that is permanently attached to or removable from the underside of the decanter 903. Permanent magnets 904 in the first coupling component 901 magnetically couple with a second array of permanent magnets 905 that are used either to drive the pumps and pallor or a rotating stirrer 906 that may be located within and removable from the interior of the decanter.

Figure 10:
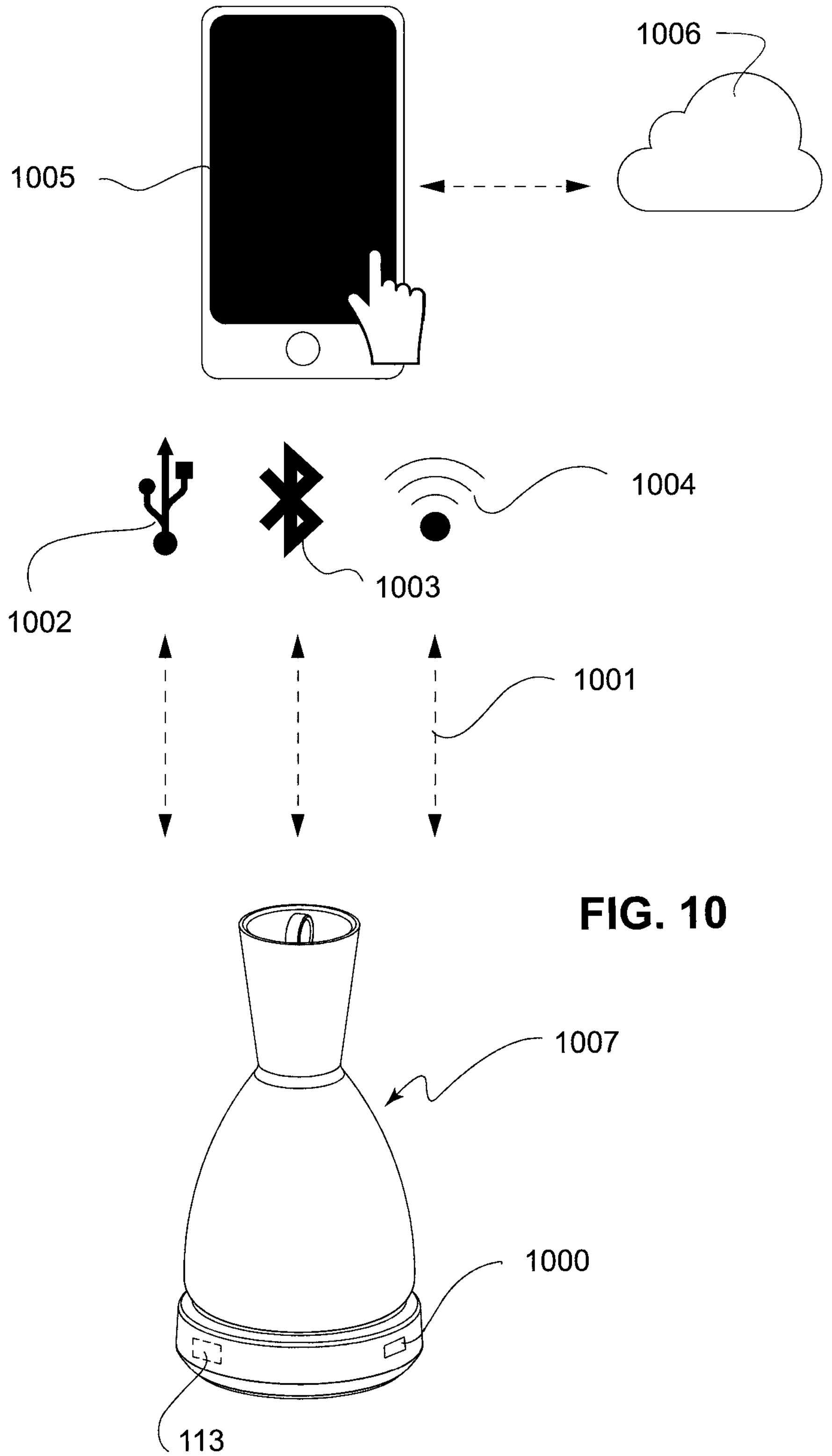
FIG. 10 is a schematic diagram of a networked wine decanter.

As shown in FIG. 10, the wireless communication module 113 located in a base of the type depicted in FIG. 1, or alternately a copper wire network connection such as a USB socket 1000 may be used to receive command signals 1001 over, for example, a USB network 1002, a blue-tooth network 1003, or a Wi-Fi network 1004. The command signals 1001 are transmitted over the appropriate network from a device 1005 such as a network enabled telephone, tablet, desktop computer or other device. The device 1005 may also be connected to or transmit its signals 1001 via a proprietary network 1006 operated by a provider of the aerating decanter 1007.

Figure 11:
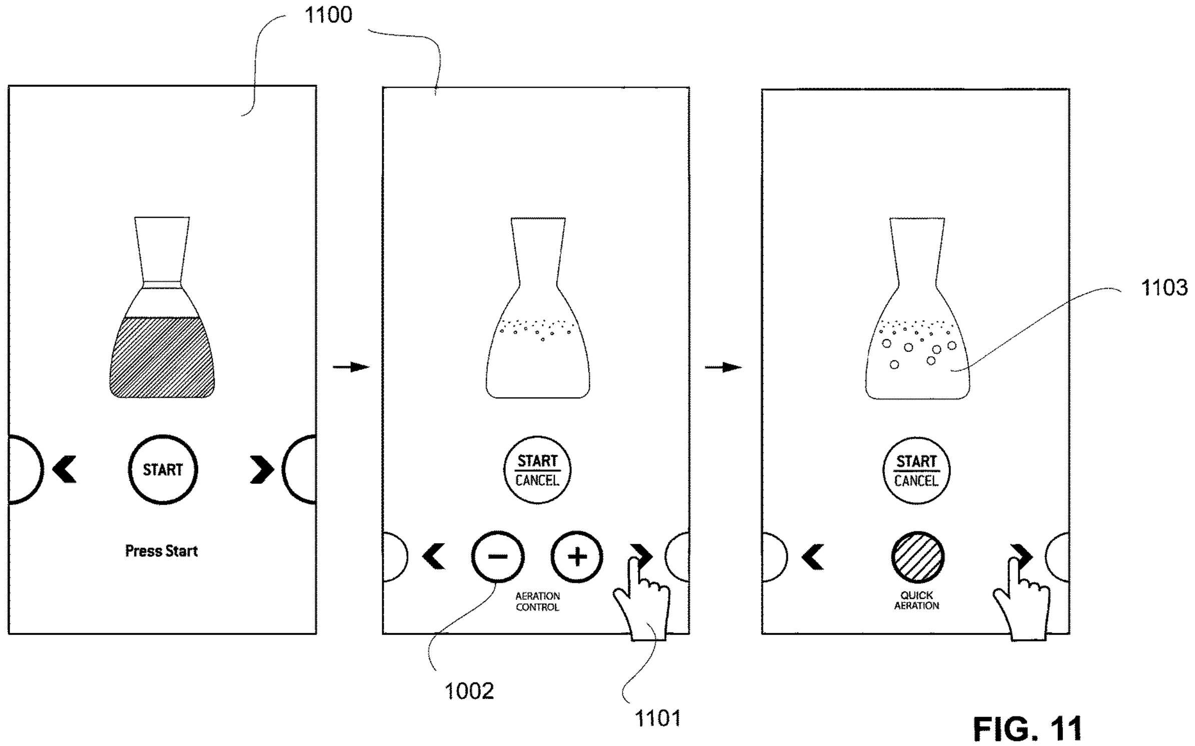
FIG. 11 is a schematic diagram illustrating a remote, wireless user interface.

As suggested in FIG. 11, the device 1005 may be provided with a touch screen 1100. The user 1101 can control the operation of the aerating decanter device 100 by touching graphic symbols 1002 corresponding with device perimeter such as pump speed, time or fully automated program such as the cleaning program previously mentioned. On-screen symbols 1103 may be used to graphically represent operational perimeters or outcomes relating to the input commands.

Figure 12:
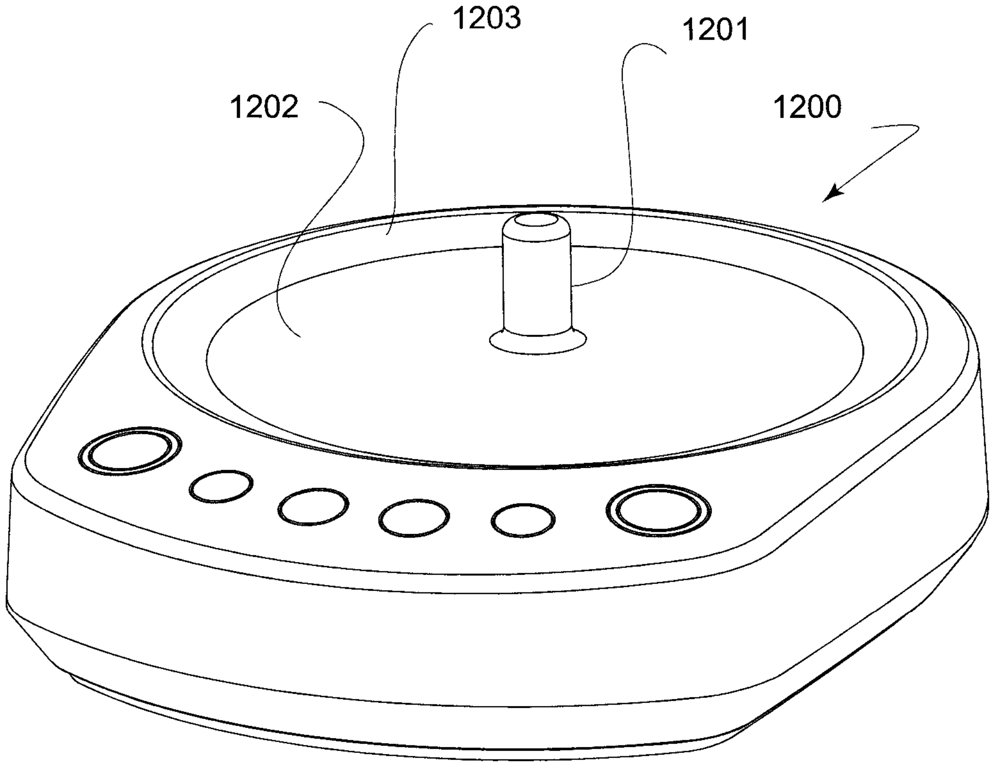
FIG. 12 is a perspective view of another base for a wine decanter.

As shown in FIG. 12, a base 1200 (of any type or style) may be provided with a centrally located shroud 1201. In the example of FIG. 12, the base has a circular depression 1202 having a tapered side wall 1203 for receiving a decanter. The features of the depression and the shroud 1201 are waterproofed to the extent that they prevent liquids in this area from entering the interior of the base, preferably being a single part with joins. The shroud 1201 locates a decanter, stabilises it and also provides protection for the driving element of a magnetically driven pump, as will be described.

Figure 13:
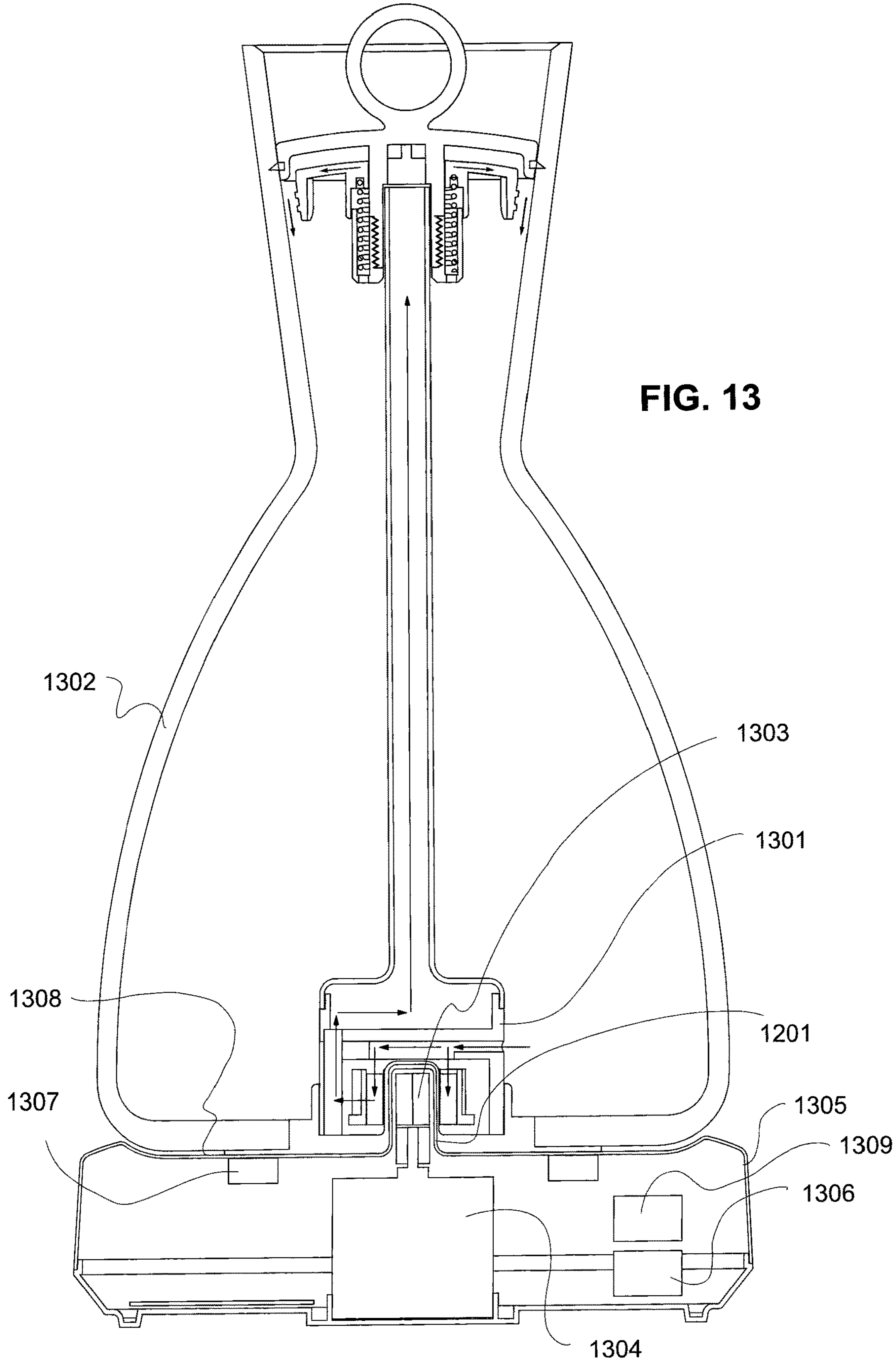
FIG. 13 is a cross-sectional view of another wine decanter and base.

As shown in FIG. 13, the shroud 1201 is received by a pump housing 1301 located inside a decanter 1302. A magnetic driving element 1303 is rotated by an electric motor 1304 located within the base 1305. The motor may be powered, for example, by rechargeable batteries 1306 located within the base. The base may also contain one or more cooling elements such as peltier cells 1307 that may be powered from the battery 1306. The peltier or other refrigeration element 1307 is preferably located adjacent to the underside of the upper surface 1308 of the base 1305. The base may also contain Wi-Fi or other communication hardware 1309 or means to achieve control over the base with a remote device such as a phone running an application, a computer or a networked appliance.

Figure 14:
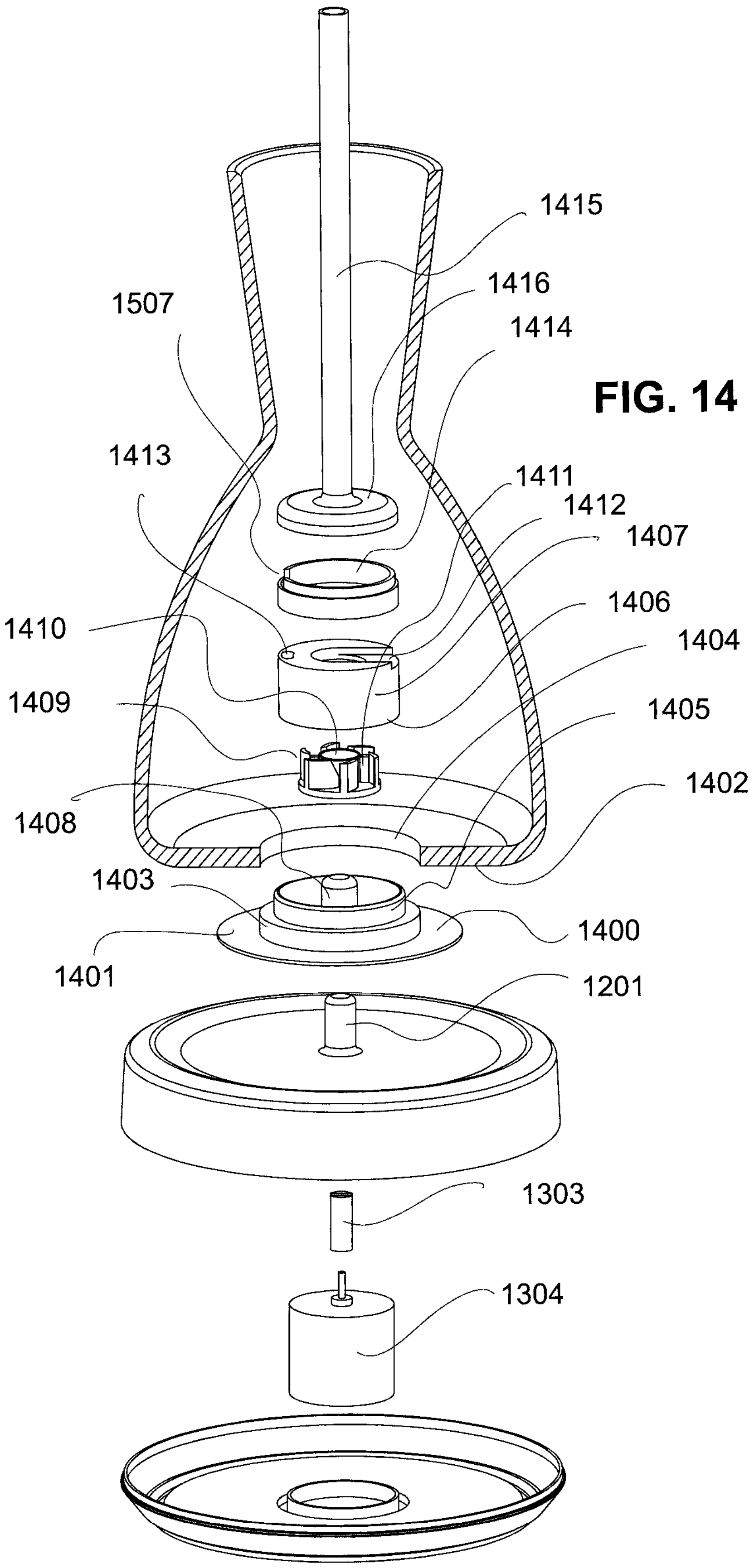
FIG. 14 is an exploded view of another wine decanter and base.

As shown in more detail in FIG. 14, the decanters' pump housing comprises a plug portion 1400 having a flange 1401 that is preferably adhered to an underside 1402 of the carafe. A plug portion has a first shoulder 1403 for engaging the through opening 1404 in the underside of the carafe and a vertical circular collar 1405 for engaging the lower rim area 1406 of a pump cover 1407. An opening on the underside of the plug portion 1400 emits the shroud 1201. The plug portion has a central and sealed receiving pocket 1408.

The pump's impeller 1409 has a central opening 1410 that fits over the pocket 1408 allowing the impeller 1409 and its pair of opposed magnets 1411 to spin around the pocket 1408 finding its own magnetic centre in the vertical direction. The pump cover 1406 has an inlet 1412 adjacent to the upper rim and a discharge opening 1413 located on an upper surface. A circumferential collar 1414 fits over the top of the cover and provides an engagement for the vertical conduit 1415. In order to facilitate removal of the pump components, particularly for cleaning, the lower rim 1406 of the cover makes a frictional and generally sealing engagement with the interior of the vertical circular collar 1405, the force requiring to dislodge the lower rim 1406 from the collar 1405 being less than the force required to dislodge the rim 1414 or the flange 1416 of the riser. In this way, lifting the vertical conduit, for example by the pour rim 1308, causes the lower rim 1406 of the housing to disengage first so that the cover 1407, rim 1414, flange 1416 and tube 1415 are removable as a single assembly.

Figure 15:
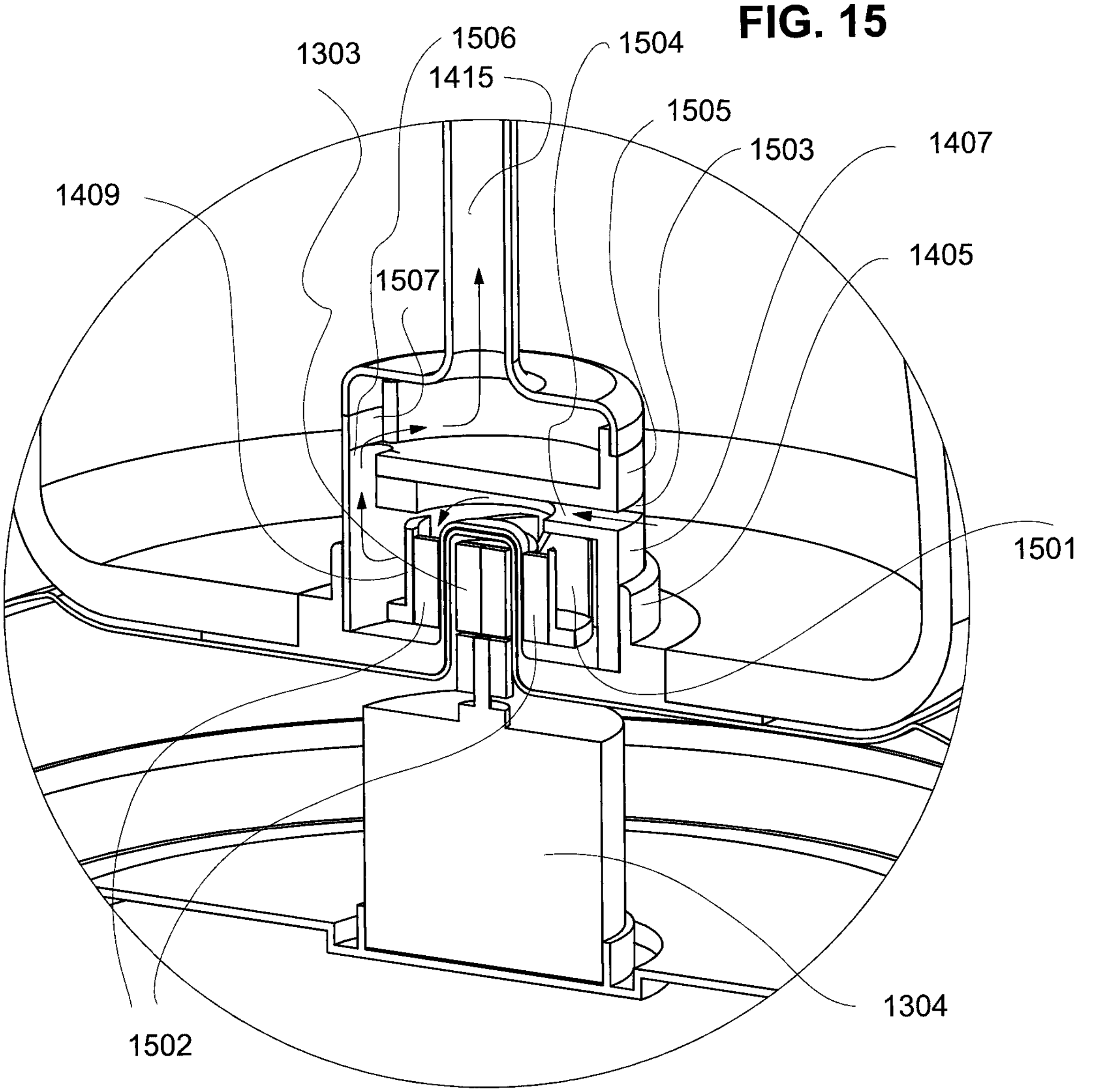
FIG. 15 is a fragmentary view in perspective of a base having a magnetic driving element.

As shown in FIG. 15, the impeller 1409 has regularly extending blades 1501 and a pair of magnets 1502 that centre on or are rotated by the magnetic driving element 1303 located within the shroud. The impeller draws liquids through an inlet opening 1503. The opening 1503 is formed from a channel 1504 on an upper surface of the cover 1407 and the underside of the ring-like spacer 1505. The floor of the spacer has an opening 1506 through which liquid is discharged into the compartment formed by the spacer below the vertical tube 1415. In this example, the upright ring that forms a portion of the spacer 1505 has a gap 1507

(see FIGS. 14 and 15) that is in registry with the discharge opening 1506, providing for better fluid flow into the tube 1415.

Figure 16:
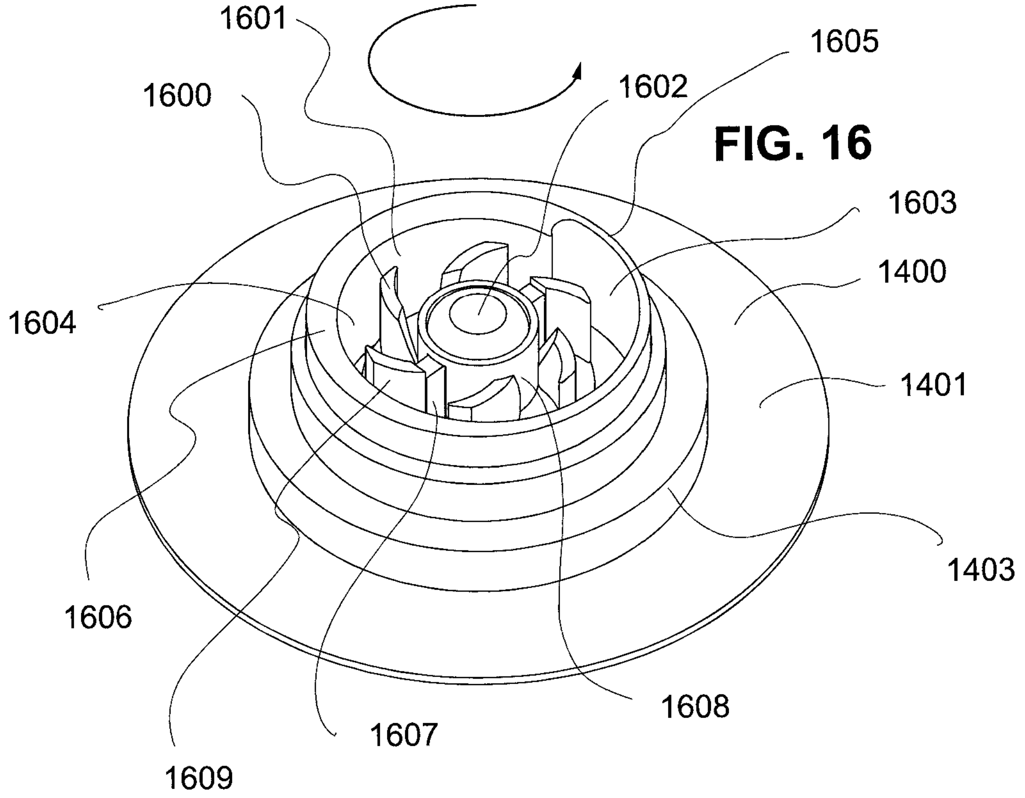
FIG. 16 is an enlarged view in perspective of an impeller received on a plug portion

As shown in FIG. 16, the removable magnetic impeller 1600 is received within a cavity 1601 formed in the plug portion 1400. Although the plug portions' pocket 1603 may be centrally located with respect to the plug portion, in preferred embodiments, the pocket 1601 is not symmetrical. In the example FIG. 16, the interior space of the pocket is reduced at the intake area 1604 and volumetrically larger at the discharge area 1603. The increased area allows the pocket to accept additional flow exiting the impeller at the discharge area 1603 that is in closest proximity to the discharge opening 1413 in the cover, assisting to maintain uniform fluid pressure around the impeller resulting in minimized hydraulic radial thrust around the impeller and thus improved impeller balance. Note that the sidewall 1606 in the intake area 1604 is thicker than the side wall 1605 in the discharge area.

Figure 17:
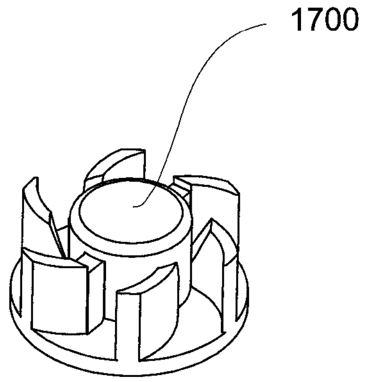
FIG. 17 is an enlarged perspective view of the impeller of FIG. 16

As shown in FIG. 17, the impeller's hub 1608 may have a top covering 1700 or other features that prevent the hub from being inserted upside down.

Figure 18:
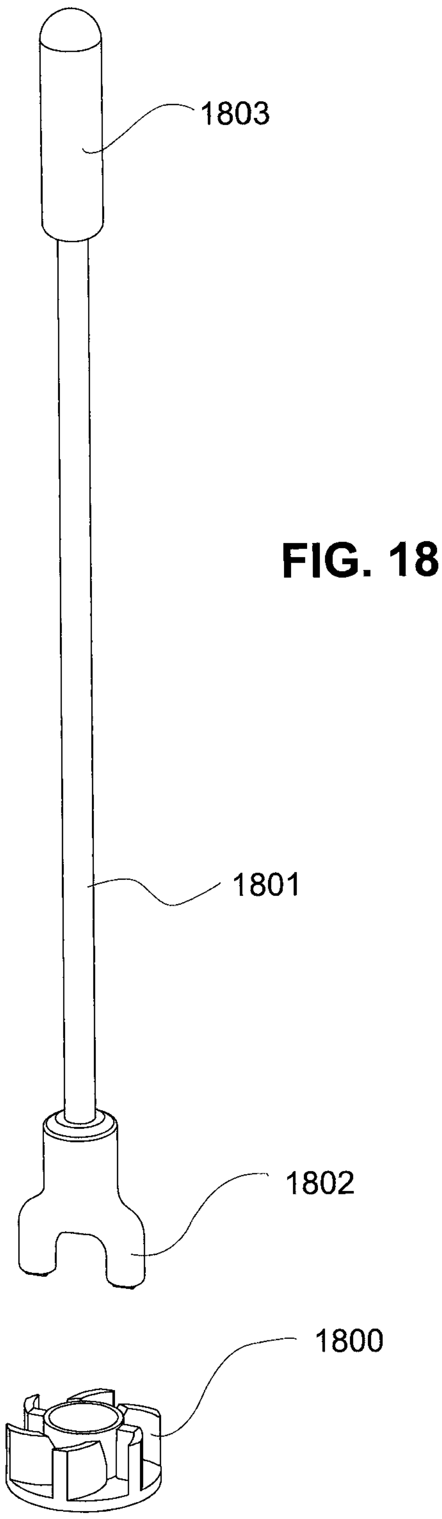
FIG. 18 is a perspective view of a removal rod for engaging the impeller of FIGS. 16 and 17.

As shown in FIG. 18, removal of the impeller 1800 from the interior of a carafe may be accomplished with a removal rod 1801. In this example, the rod 1801 carries a pair of magnets 1802 and a lower end and has a handle 1803 at an upper end. Instead of magnets, the lower end may feature a mechanical clip, hook or other means of engaging or removing the impeller 1800.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A decanter for a beverage, the decanter comprising:
- a floor;
- a pump located above the floor, wherein the pump is adapted to recirculate the beverage within the decanter;
- a vertical tube that extends upwardly from the pump and that terminates at a solid or unperforated cap within the decanter, wherein the pump cooperates with the vertical tube,
- wherein the cap has a side wall in which is formed a circumferential groove for receiving a peripheral seal and a centrally located neck for receiving the vertical tube,
- wherein the neck provides a spout opening below an underside of the cap that directs a flow of beverage from the pump against an interior sidewall of the decanter,
- wherein the flow is directed outwardly by the shape of the underside of the cap.

2. The decanter of claim 1, wherein the spout comprises radial parts.

3. The decanter of claim 1, wherein:
- the spout discharges to create a curtain of beverage around the interior sidewall.

4. The decanter of claim 3, wherein:
- the spout comprises a circumferential gap.

5. The decanter of claim 4, wherein:
- the gap is located between an upper stopper part having a circumferential seal that infringes on an interior sidewall of the decanter and a lower part that attaches to the tube.

6. A decanter for a beverage, the decanter comprising:
- a floor;
- a pump located above the floor, wherein the pump is adapted to recirculate the beverage within the decanter; and
- a tube that extends upwardly from the pump and that terminates within the decanter, wherein the pump cooperates with the tube, and the tube includes a spout that directs a flow of beverage from the pump against an interior sidewall of the decanter, the spout discharges to create a curtain of beverage around the interior sidewall, wherein the spout comprises a circumferential gap, the gap is located between an upper stopper part having a circumferential seal that infringes on an interior sidewall of the decanter and a lower part that attaches to the tube, wherein the lower part is biased toward the upper part and the upper part rotates so as to selectively align cooperating openings that admit air into the decanter.

7. The decanter of claim 1, wherein:

the decanter is transparent or translucent.

8. The decanter of claim 1, wherein:

the plate is curved and the decanter is transparent or translucent.

9. The decanter of claim 1, wherein:

the spout discharges to create a curtain of beverage around the interior sidewall and the decanter is transparent or translucent.

10. The decanter of claim 3, wherein:

the spout comprises a circumferential gap and the decanter is transparent or translucent.

11. The decanter of claim 4, wherein:

the gap is located between an upper stopper part having a circumferential seal that infringes on an interior sidewall of the decanter and a lower part that attaches to the tube and the decanter is transparent or translucent.

12. A decanter for a beverage, the decanter comprising:

a floor;

a pump located above the floor, wherein the pump is adapted to recirculate the beverage within the decanter; and a tube that extends upwardly from the pump and that terminates within the decanter, wherein the pump cooperates with the tube, and the tube includes a spout that directs a flow of beverage from the pump against an interior sidewall of the decanter, the spout discharges to create a curtain of beverage around the interior sidewall, wherein the spout comprises a circumferential gap, the gap is located between an upper stopper part having a circumferential seal that infringes on an interior sidewall of the decanter and a lower part that attaches to the tube, wherein the lower part is biased toward the upper part and the upper part rotates so as to selectively align cooperating openings that admit air into the decanter and the decanter is transparent or translucent.

* * * * *